United States Patent Office 3,513,228
Patented May 19, 1970

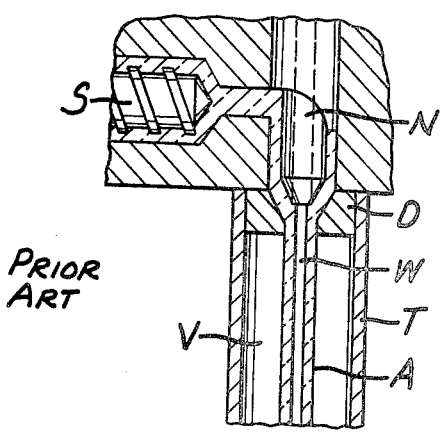
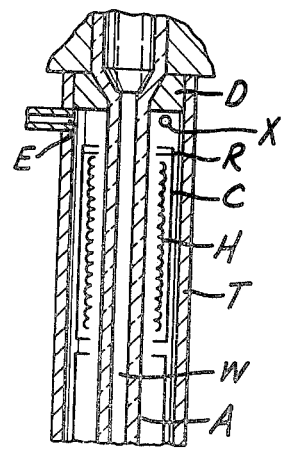
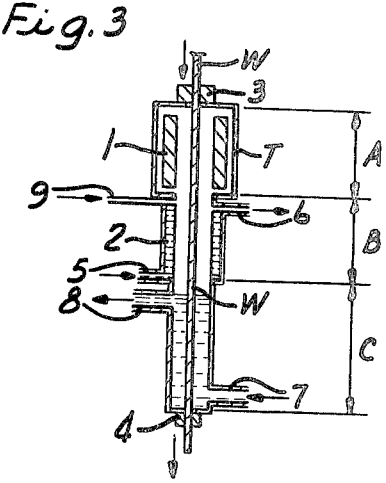
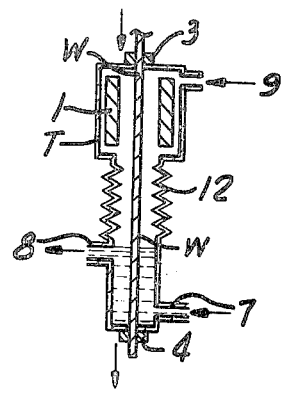
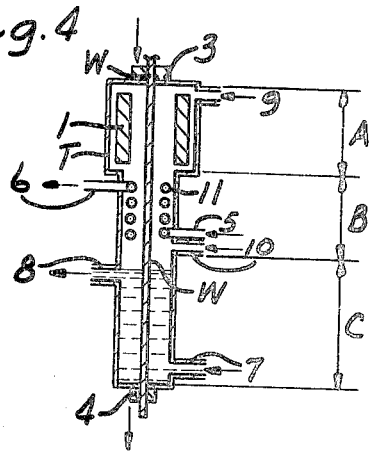

3,513,228
METHOD OF CONTINUOUSLY CURING RUBBER OR PLASTIC COATED CONDUCTOR
Hirokazu Miyauchi, Osaka, and Yasuo Wakabayashi, Settsu, Japan, assignors to Sumitomo Electric Industries, Ltd., Osaka, Japan, a company of Japan
Filed June 7, 1967, Ser. No. 644,329
Claims priority, application Japan, June 11, 1966, 41/37,892; Apr. 20, 1967, 42/24,776, 42/24,777, 42/42,778, 42/32,743
Int. Cl. B29f 3/10
U.S. Cl. 264—25   2 Claims

ABSTRACT OF THE DISCLOSURE

In the curing of insulating material extruded upon the conductor to be insulated, the uncured coated wire is first passed through a heating zone so that the insulating material will be cured, as by vulcanizing or crosslinking and the cured conductor is thereafter cooled, the curing carried on within predetermined temperatures to prevent defects in curing and decomposition of the insulating material.

---

The present invention relates to a method for crosslinking in rubber or plastics, electric wire.

Saturated steam is commonly used as a heating means for crosslinking in rubber or plastics, electric wire. However, the relationship between the pressure and the temperature of saturated steam has a characteristic curve as shown in the drawing FIG. 7 and the pressure has to be a little more than 15 kg./cm.$^2$ if the temperature is to be 200° C.

To maintain such a high pressure as 15 kg./cm.$^2$, a large scale equipment will be necessary and this will prove expensive. On the other hand, such a degree of pressure is excessively high for the prevention of foaming at the time of heating. This contradiction is a disadvantage which is unavoidable when saturated steam is used.

Furthermore, when the steam is 200° C. or higher, a pressure increase of 5 kg./cm.$^2$ is required to raise the temperature of the steam by 10° C., as can be seen clearly from the drawing. Even if it is attempted to raise the tempertaure further for the purpose of expediting crosslinking, saturated steam above 200° C. is not good for practical purposes because it is only the pressure that advances further.

The present invention provides a method for crosslinking rubber and plastics, eliminating the above mentioned disadvantages of the use of saturated steam by obtaining a high temperature independently of pressure through separate settings of temperature and pressure.

In the method of the present invention, infrared rays are used as a heating means. Infrared rays are obtainable by a simple apparatus and nevertheless readily produce temperatures above 200° C. and enhance crosslinking speed. Since a temperature exceeding 300° is likely to degrade rubber and plastics, it is preferable for practical purposes to use a temperature between 200° C. and 300° C.

With regard to the pressure means, it is necessary to avoid allowing rubber and plastics to come in contact with oxygen because they are apt to get oxidized at high temperatures. An inert gas, such as nitrogen, carbon dioxide, etc., is therefore used. Although a gas pressure of 2 kg./cm.$^2$ or more is sufficient, it is preferable to have a gas pressure of 3 kg./cm.$^2$ or more to prevent foaming at high temperatures, while on the other hand, it is preferable to maintain the gas pressure less than 8 kg./cm.$^2$ from the viewpoint of equipment and other conditions.

Other objects and advantages appear hereinafter in the following description and claims.

The accompanying drawings show for the purpose of exemplification without limiting the invention or claims thereto, certain practicable embodiments illustrating the principles of this invention wherein:

FIG. 1 represents the prior art apparatus used for crosslinking the extruded cable.

FIG. 2 is a sectional view showing the general embodiment of the present invention utilizing an inert gas environment.

FIG. 3 is the cross-sectional view showing the complete process comprising three zones for crosslinking uncured sheathed cable.

FIG. 4 is a cross-sectional view of the apparatus comprising this invention similar to FIG. 3 showing a modified form of zone B.

FIG. 5 is a cross-sectional view of the apparatus comprising this invention showing a modified form of zone B.

Figure 7:
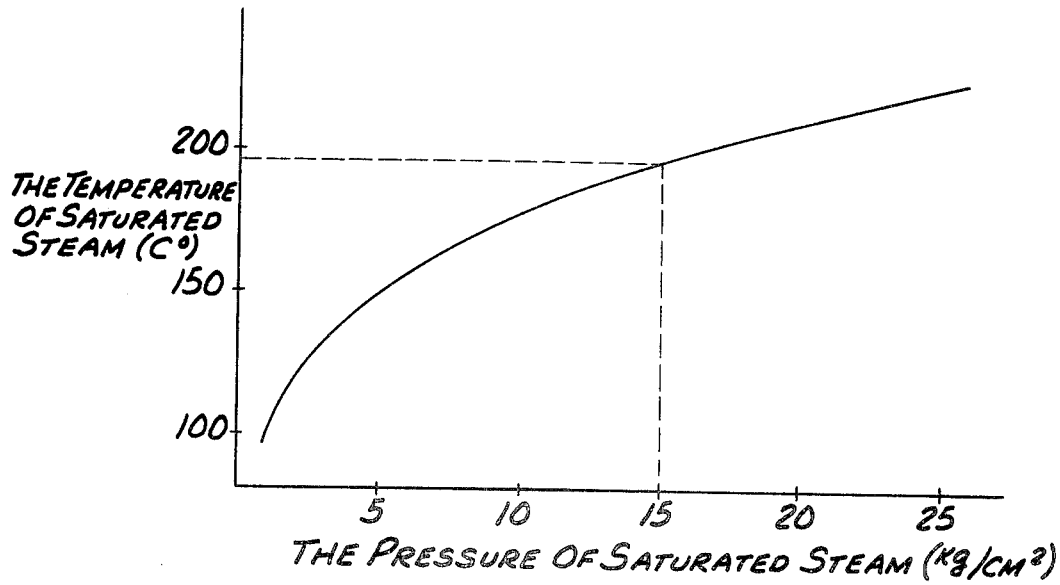
FIG. 7 is a graph illustrating the characteristic curve for temperature versus pressure of saturated steam.

Now the method of and apparatus for the crosslinking in rubber or plastics, electric wire according to the present invention will be explained with reference to examples of its embodiment together with the figures.

EXAMPLE OF EMBODIMENT 1

A copper conductor having a nominal cross-sectional area of 22 mm.$^2$ was covered to a thickness of approximately 3 mm. with an uncured polyethylene compound consisting of 100 phr. of polyethylene having a specific gravity of 0.92 g./cc. and 2 phr. of di-x-cumyl peroxide. It was then heated at 250° C. for 2 minutes with an infrared ray heater in nitrogen gas at a pressure of 1 kg./cm.$^2$, 3 kg./cm.$^2$ and 5 kg./cm.$^2$ respectively. According to the results, when the pressure was 3 kg./cm.$^2$ and 5 kg./cm.$^2$, the insoluble fraction of xylene at 120° C. was 75% (representing the degree of crosslinking) and there was no air bubble observed. When the pressure was 1 kg./cm.$^2$, air bubbles were observed.

EXAMPLE OF EMBODIMENT 2

A copper conductor having a nominal cross sectional area of 100 mm.$^2$ was covered to a thickness of approximately 13 mm. with an uncured compound consisting of 100 phr. of polyethylene having a specific gravity of 0.92 g./cc., 3 phr. of di-α-cumylperoxide and 0.3 phr. of antioxidant. It was heated at 250° C. for 25 minutes by an infrared ray heater in nitrogen gas of 3 kg./cm.$^2$ pressure. As a result, complete crosslinking was effected and polyethylene cable entirely free from air bubbles was obtained.

EXAMPLE OF EMBODIMENT 3

A copper conductor having a diameter of 1.0 mm. was covered to a thickness of 1.0 mm. with an uncured compound consisting of 100 phr. of ethylene polymer containing 8 weight percent of vinyl acetate and 1.5 phr. of 2.5-dimethyl-2.5-di(t-tulyl perioxy) hexane, and was heated at 250° C. for 2 minutes with an infrared ray heater in nitrogen of 2 kg./cm.$^2$ pressure.

As a result, crosslinking was effected completely and a highly flexible electric wire with a very transparent insulating layer entirely free from air bubbles was obtained.

In case crosslinking is carried out following the extrusion-covering without cooling, the conductor W moves downward through the nipple N, as shown in FIG. 1, and the insulating material supplied by the extruders is shaped by the die D to cover the conductor W, which then enters the curing tube T. In apparatus heretofore used, the curing tube T was filled with a high pressure steam V, which heats and cures the sheath A.

In the case of an apparatus of this kind, the high pressure steam is in direct contact with the die, so that the die in the neighborhood of the cross-head D becomes higher in temperature. Even if the extrusion is made at an appropriate temperature at the beginning of the operation, excessive heating caused by the steam results as time goes on. As a consequence, a failure may take place during continuous operation of the extruder in that the curing reaction of the insulating material A will take place in the cross-head, which is a deterrent to the smooth flow of the plastic material, and results in a decrease in the quantity of extruded material and a consequential decrease in the outer diameter of the insulated wire.

By the embodiment of the present invention illustrated in subsequent figures, however, it is possible to effect the crosslinking of the sheathing material without fear of a failure in the smooth flow of material taking place.

In FIG. 2, D denotes the die, and a protective cover C is provided for the reflective plates R on top and bottom. The heater H is housed with the plate R within the crosslinking tube T and radiates infrared rays. The inert gas is supplied into the curing tube T through the opening E.

In this way, the surface of the electric wire is subjected directly to radiant heating by the infrared rays radiated by the heater H, while the temperature of the inert gas for preventing foaming of sheathing material scarcely rises even. Thus overheating of the die D and crosshead does not take place. If necessary, the inert gas may be circulated in the tube T to suppress the temperature of the gas in contact with the die. Usually, however, the gas temperature becomes saturated at a low point because of the dissipation of heat from the tube T and other parts, so that it is not particularly necessary to consider the cooling of the gas.

EXAMPLE OF EMBODIMENT 4

With an apparatus as shown in FIG. 2 in use, chemically crosslinked polyethylene electric wire was manufactured by extrusion-covering and continuous curing, the pressure of nitrogen gas being 5 kg./cm.$^2$.

From the beginning of the operation, the temperature of nitrogen gas at the position X was measured by means of a thermocouple and it was found that the rise in temperature was very little, the temperature being 17° C. before the operation, 45° C. after 30 minutes and 45° C. after 2 hours.

If the conventional method, as shown in FIG. 1, were employed, steam V would be at a temperature of about 200° C. The die D is therefore subjected to heat in quite a different way. When the method of the present invention was employed, there was no problem in controlling the temperature of the die.

EXAMPLE OF EMBODIMENT 5

With an apparatus as shown in FIG. 2 in use, an ethylenepropylene elastomer insulated cable, conductor size 100 mm. and insulation thickness 4 mm., was cured.

When the pressure of the nitrogen gas was 8 kg./cm.$^2$ and radiant heating was utilized, the temperature of the die D could be controlled and maintained at 90° C. even after continuous operation for 7 hours. When steam of 15 kg./cm.$^2$ was used, however, the temperature of the die rose to 110° C. after 30 minutes' operation and scorching occurred after an hour's operation and extrusion became impossible.

In using the apparatus of the present invention for curing in the above-mentioned way, it is preferable that the apparatus is such that the uncured core of polyethylene or vulcanized rubber cable is heated for the crosslinking reaction under the pressure of a gas which does not oxidize rubber and plastics and the cable is then cooled and solidified into a finished product by proceeding under pressure through a precooling zone and a water-cooling zone.

The other embodiments of the present invention as shown in FIGS. 3 through 6 will now be explained in detail.

In FIG. 3, the apparatus, through which the cable core W passes through, starting at the supply packing 3 and passing out the take-up packing 4, comprises three stages, the radiant heating zone A, the precooling zone B, and the water or direct cooling zone C. A radiant heating device such as an infrared ray heater 1 is housed in the radiant heating zone. A water jacket 2 is provided in the precooling zone, cold water being supplied from the inlet 5 and passed out through the outlet 6. In the water cooling zone C, water is brought into direct contact with the cable core W, high pressure water being supplied from the inlet 7 and passed out through the outlet 8. The inlet 9 is for the entrance of an inert gas, such as nitrogen, carbon dioxide, etc., which will not oxidize rubber or plastic.

The precooling zone B effects the precooling of the heated cable and at the same time condenses any vaporized water from zone C, serving the purpose of preventing vaporized water from affecting, in a detrimental way, the heater 1 and also of improving the cooling effect, since the high pressure water for cooling in zone C and the heating zone A are separated by the precooling zone B and the temperature rise of the high pressure water is made free from the influence of the atmosphere in the heating zone.

The requisite length of the cooling zone is determined in view of the size of the apparatus and the desired line speed. The condensing ability in zone B may be enhanced by using a longer jacket 2 as shown in FIG. 3, or by using a condensing pipe 11 as shown in FIG. 4, or by providing cooling fins 12 as shown in FIG. 5.

A preferable embodiment of this invention is to separate the radiant heating heater into two or more sections so that the temperature of each of the sections may be controlled separately.

Figure 6:
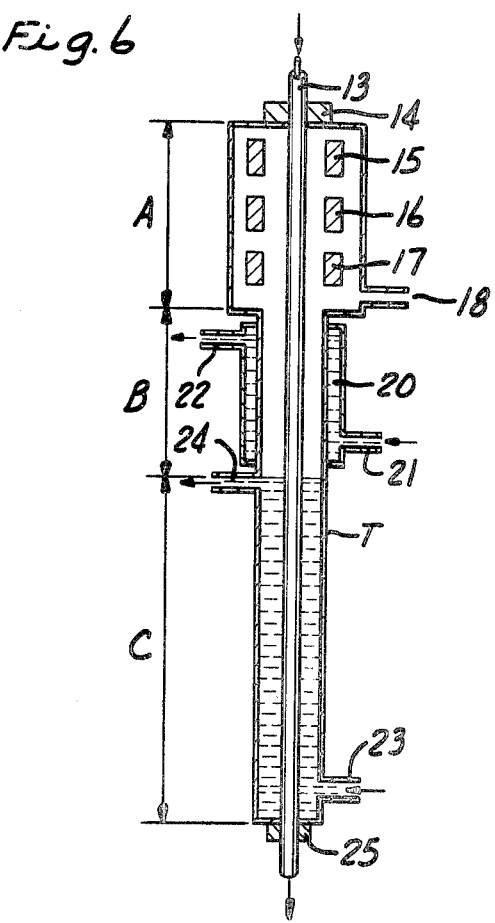
FIG. 6 is a cross-sectional view of a preferred embodiment comprising this invention wherein the heating zone A comprises several independent heating stages.

In FIG. 6, the uncured (unvulcanized) plastics or rubber cable 13, which is continuously covered with the insulating material and sent out from the extruder into the curing tube T through the packing 14 on the supply side of the tube T. In case curing is effected immediately after the extrusion-sheathing, the packing 2 is not necessary and the curing tube may be directly joined to the crosshead of the extruder. In the heating zone A, a plurality of stages of infrared ray heaters are provided. In the example shown in FIG. 6, the first stage of the heater is 15, the second stage of the heater is 16 and the third stage of the heater is 17; these stages are provided independent of each other, so that they can be controlled separately.

The inlet 18 is provided for the inert gas to be pressurized in the curing tube T at the desired pressure. In the precooling zone B, a precooling jacket 20 surrounds the curing tube T and is provided with the inlet 21 and the outlet 22. In the cooling zone C, water is permitted to circulate from the inlet 23 through the tube T to be discharged at the outlet 24. The cable 13 then passes through the packing 25.

In the above described structure, the first stage 15 of the heater in the heating zone A is made large enough so that the cable 13 is heated by the supply temperature to a temperature sufficient for the crosslinking vulcanization reaction to take place. The second and subsequent stages will be so made that the temperature of the cable is maintained for a time required to complete the crosslinking vulcanization reaction.

By setting the above-mentioned first stage 15 of the heater at a high temperature, the crosslinking vulcanization reaction is accomplished in a much quicker manner, and, as a consequence the manufacturing capability is greatly increased.

Where three or more heater stages in the heating zone are provided, the first and second stages may be used for heating and the rest of the stages may be used for the maintenance of the temperature. The capacity of each stage is to be determined by the cable size, line speed, etc.

The following examples explain the use of the apparatus of FIG. 6.

EXAMPLE OF EMBODIMENT 6

Using the structure as shown in FIG. 6, the length of the heating zone was made 2 m., that of the precooling zone 1 m. and that of the cooling zone 4 m. When curing uncured electric wire having a conductor diameter of 22 sq. mm. and insulation thickness of 3.5 mm., the first stage heater was set at 6 kw., the second stage heater at 1.5 kw. and the third stage heater at 1.5 kw. A sufficiently cured crosslinked polyethylene electric wire was obtained with these settings, with the line speed maintained at 3 m./min.

Then the first stage heater was changed to 3.5 kw., the second stage to 3.5 kw. and the third stage to 3.5 kw. Experimenting with this at the same line speed of 3 m./min., it was found that crosslinking was not completed.

Then, again, the first stage, the second stage and the third stage heater were reset at 3 kw. each and the line speed was reset at 2.2 m./min., and sufficient crosslinking was effected.

The results obtained indicate that a higher efficiency can be had by controlling the output of the heaters separately even if the electric power supplied to the independent heaters is small.

EXAMPLE OF EMBODIMENT 7

Using the same structure as in the example of Embodiment 1, the curing of butyl rubber cable and the ethylene-propylene-diene terpolymer cable was investigated, and similar results upon curing were obtained.

1. In the case of butyl rubber cable:

| | First stage heater | Second stage heater | Third stage heater | Line speed |
|---|---|---|---|---|
| (a) | 6 kw | 2 kw | 1 kw | 7 m./min. |
| (b) | 3 kw | 3 kw | 3 kw | 5.5 m./min. |

In the case of ethylene-propylene rubber cable:

| | First stage heater | Second stage heater | Third stage heater | Line speed |
|---|---|---|---|---|
| (a) | 6 kw | 1.5 kw | 1.5 kw | 4.5 m./min. |
| (b) | 3 kw | 3 kw | 3 kw | 3.5 m./min. |

Similarly cured cables were obtained with settings of (a) and (b).

By separating the heating stages of the cable and maintaining the temperature as described above, it is possible to accelerate the crosslinking curing reaction without having a cable insulating material reach a temperature above its decomposition temperature. Also it is possible to increase the line speed.

Furthermore, the total electric power necessary for the heaters is rather less than that required for a single heater set for uniform heating. There is also another advantage in that the size of the apparatus necessary is far smaller than that required for uniform heating by a single heater set.

The insulating materials that can be cured by the present invention are general cable insulating materials which require curing, such as polyethylene containing an organic peroxide or the like as a crosslinking agent, polyethylene copolymer requiring crosslinking, ethylene-propylene rubber, butyl rubber, SBR, chloroprene rubber, natural rubber, etc.

What is claimed is:

1. The method of continuously manufacturing an insulated conductor comprising the steps of continuously applying a curable rubber or plastic insulating material onto a conductor to cover the same, heating the covered conductor by passing it through a radiant heating zone having a pressurized inert gas atmosphere to cure the insulating material without foaming, precooling the cured covered conductor by passing the same through a cooling inert gas atmosphere adjacently exposed directly to the inert gas atmosphere of the heating zone, and finally cooling the precooled covered conductor by passing the same through a liquid coolant adjacently exposed directly to the inert gas atmosphere of the precooling inert gas atmosphere.

2. The method of claim 1 wherein the step of heating is carried out in a plurality of independently controlled stages.

References Cited

UNITED STATES PATENTS

| 2,948,020 | 8/1960 | D'Ascdi | 264—174 |
| 2,979,778 | 4/1961 | Fitzsimons | 264—85 |
| 3,295,163 | 1/1967 | Bachus | 18—6 |
| 2,384,224 | 9/1945 | Williams | 264—174 |

DONALD J. ARNOLD, Primary Examiner

R. H. SHEAR, Assistant Examiner

U.S. Cl. X.R.

264—85, 174; 18—6